(12) United States Patent
Liu et al.

(10) Patent No.: US 11,218,663 B2
(45) Date of Patent: Jan. 4, 2022

(54) VIDEO CHUNK COMBINATION OPTIMIZATION

(71) Applicant: HULU, LLC, Santa Monica, CA (US)

(72) Inventors: Chen Liu, Beijing (CN); Wenhao Zhang, Beijing (CN); Xiaobo Liu, Beijing (CN); Deliang Fu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/909,767

(22) Filed: Jun. 23, 2020

(65) Prior Publication Data

US 2020/0322567 A1    Oct. 8, 2020

Related U.S. Application Data

(63) Continuation of application No. 16/228,548, filed on Dec. 20, 2018, now Pat. No. 10,778,938.

(51) Int. Cl.
*H04N 21/2662*    (2011.01)
*H04N 5/92*       (2006.01)
(Continued)

(52) U.S. Cl.
CPC .............. *H04N 5/92* (2013.01); *H04N 19/40* (2014.11); *H04N 21/234309* (2013.01); *H04N 21/2662* (2013.01)

(58) Field of Classification Search
CPC ...... H04N 5/92; H04N 21/2626; H04N 19/40; H04N 21/234039; H04N 19/436; H04N 21/43439
See application file for complete search history.

(56) References Cited

U.S. PATENT DOCUMENTS 5,847,760 A    12/1998  Elmaliach et al.
9,197,689 B2 *  11/2015  Ha ..................... H04L 65/602
(Continued)

FOREIGN PATENT DOCUMENTS

EP    2541935 A1 *  1/2013 ........... H04N 19/124
EP    2541935 A1     1/2013
(Continued)

OTHER PUBLICATIONS

Corresponding U.S. Appl. No. 16/228,548, Notice of Allowance dated Mar. 23, 2020.
(Continued)

*Primary Examiner* — Eileen M Adams
(74) *Attorney, Agent, or Firm* — Fountainhead Law Group P.C.

(57) ABSTRACT

In some embodiments, a method determines a combination of sub-bitstream chunks from a plurality of sub-bitstreams for a video. The combination of sub-bitstream chunks includes a quality measurement. The method exchanges a sub-bitstream chunk in the combination of sub-bitstream chunks with another sub-bitstream chunk from another sub-bitstream in the plurality of sub-bitstreams based on a relationship of a change in bitrate to a change in quality due to the exchanging. The method continues to exchange a sub-bitstream chunk in the combination of sub-bitstream chunks with another sub-bitstream chunk until the quality measurement of the combination of sub-bitstream chunks meets a target quality and outputs the combination of sub-bitstream chunks.

20 Claims, 12 Drawing Sheets

(51) Int. Cl.
*H04N 19/40* (2014.01)
*H04N 21/2343* (2011.01)

(56) References Cited

U.S. PATENT DOCUMENTS

| | | | |
|---|---|---|---|
| 9,516,085 B2* | 12/2016 | McCarthy | H04N 21/2393 |
| 10,003,851 B2* | 6/2018 | Fisher | H04N 7/17318 |
| 10,439,900 B2* | 10/2019 | Wright | G06F 11/3485 |
| 10,484,446 B1 | 11/2019 | Waggoner et al. | |
| 10,778,938 B2* | 9/2020 | Liu | H04N 9/79 |
| 2006/0140276 A1 | 6/2006 | Boyce et al. | |
| 2006/0222078 A1* | 10/2006 | Raveendran | H04N 19/176 |
| | | | 375/240.16 |
| 2007/0116117 A1 | 5/2007 | Tong et al. | |
| 2008/0052414 A1 | 2/2008 | Panigrahi et al. | |
| 2008/0137735 A1* | 6/2008 | Kamariotis | H04N 19/198 |
| | | | 375/240.03 |
| 2008/0195743 A1* | 8/2008 | Brueck | H04N 21/23439 |
| | | | 709/231 |
| 2008/0212677 A1 | 9/2008 | Chen et al. | |
| 2008/0310497 A1* | 12/2008 | Amonou | H04N 21/234354 |
| | | | 375/240.01 |
| 2010/0246677 A1 | 9/2010 | Nilsson | |
| 2011/0200266 A1 | 8/2011 | Fuchie et al. | |
| 2011/0255555 A1 | 10/2011 | Alexander | |
| 2011/0296485 A1 | 12/2011 | Nilsson et al. | |
| 2012/0011268 A1 | 1/2012 | Ngo et al. | |
| 2012/0147958 A1* | 6/2012 | Ronca | H04N 19/14 |
| | | | 375/240.16 |
| 2012/0257675 A1* | 10/2012 | Wang | H04N 19/33 |
| | | | 375/240.13 |
| 2013/0298170 A1* | 11/2013 | ElArabawy | H04L 47/30 |
| | | | 725/62 |
| 2014/0139733 A1 | 5/2014 | MacInnis et al. | |
| 2014/0143823 A1 | 5/2014 | Manchester et al. | |
| 2016/0134881 A1* | 5/2016 | Wang | H04L 65/607 |
| | | | 375/240.02 |
| 2016/0182941 A1* | 6/2016 | Crabtree | H04N 21/8456 |
| | | | 725/115 |
| 2016/0241836 A1 | 8/2016 | Cole et al. | |
| 2018/0070113 A1* | 3/2018 | Phillips | H04N 21/43615 |
| 2020/0021634 A1* | 1/2020 | Li | H04L 65/4092 |
| 2020/0059654 A1 | 2/2020 | Kelly et al. | |
| 2021/0084523 A1* | 3/2021 | Kucera | H04L 41/0896 |

FOREIGN PATENT DOCUMENTS

| | | |
|---|---|---|
| WO | 2008133677 A1 | 11/2008 |
| WO | 2012078965 A1 | 6/2012 |

OTHER PUBLICATIONS

International Application No. PCT/US19/61975, International Search Report and Written Opinion, dated Feb. 5, 2020, 29 pages.

* cited by examiner

VIDEO CHUNK COMBINATION OPTIMIZATION

CROSS REFERENCE TO RELATED APPLICATIONS

The present disclosure is a continuation of U.S. Non-Provisional Application Ser. No. 16/228,548, entitled "VIDEO CHUNK COMBINATION OPTIMIZATION", filed Dec. 20, 2018, which is incorporated herein by reference in its entirety for all purposes.

BACKGROUND

Media programs, including audio-video data, are increasingly distributed over telecommunications networks for the viewing and enjoyment of users. Services provide media programs to users through various video delivery technologies (e.g., streaming). For example, the service may allow a user to view the latest television shows or movies using a media player. After a television show airs, the service may experience a high demand for the television show. In one example, a media program provider provides the television show to the service. The service then needs to transcode the television show before the service can make the television show available to the users. For example, the television show may need to be transcoded into different bitrates. Due to the popularity of the video, the service would like to transcode the media program as fast as possible. However, if the transcoding is performed by one transcoder, the service must wait until the transcoder finishes transcoding the entire television show before making the television show available to users. A typical runtime for transcoding a two-hour 1080p video is about 48 hours using H.264 transcoder. Also, if a higher video resolution video, such as a 4K resolution or even higher, and a more complicated transcoding technique such as High Efficiency Video Coding (HEVC)/H.265 or VP9 is used, the transcoding time of new video content will dramatically increase.

In addition to transcoding a video quickly, a service wants to provide the highest quality video possible. A video may be composed of sequential camera shots, which may contain diverse video characteristics. From a video coding standpoint, one way to encode the camera shots is to apply different coding parameters to each different camera shot based on the characteristics of each camera shot. This results in the best compression results of having the highest quality with the lowest bitrate. However, due to the complexity of reconfiguring the transcoder for each camera shot, this method is not used. Rather, a transcoder typically encodes the entire video based on the same transcoding parameters. This results in a transcoding that may not achieve the highest possible quality.

DETAILED DESCRIPTION

Described herein are techniques for a video transcoding system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments perform a multipass transcoding of chunks of a video using different transcoding parameters. This generates multiple sub-bitstreams of chunks within an entire sub-bitstream being transcoded using the same transcoding parameters, but each sub-bitstream is encoded using the different transcoding parameters. A single sub-bitstream may not include chunks that include characteristics that are all optimal as discussed in the Background. However, another sub-bitstream may include one or more chunks that may be optimal based on a target, such as a target quality. Finding the correct combination, however, may be difficult because just selecting the chunks from each bitstream that have the highest quality may not meet the target. Accordingly, some embodiments determine an optimal chunk combination by selecting chunks from the sub-bitstreams to obtain an optimal transcoded bitstream for a given video based on the target. The process determines the optimal chunk combination by minimizing computations and also by minimizing the time taken to select that combination. This is important when transcoding videos for release on a video delivery service.

Figure 1:
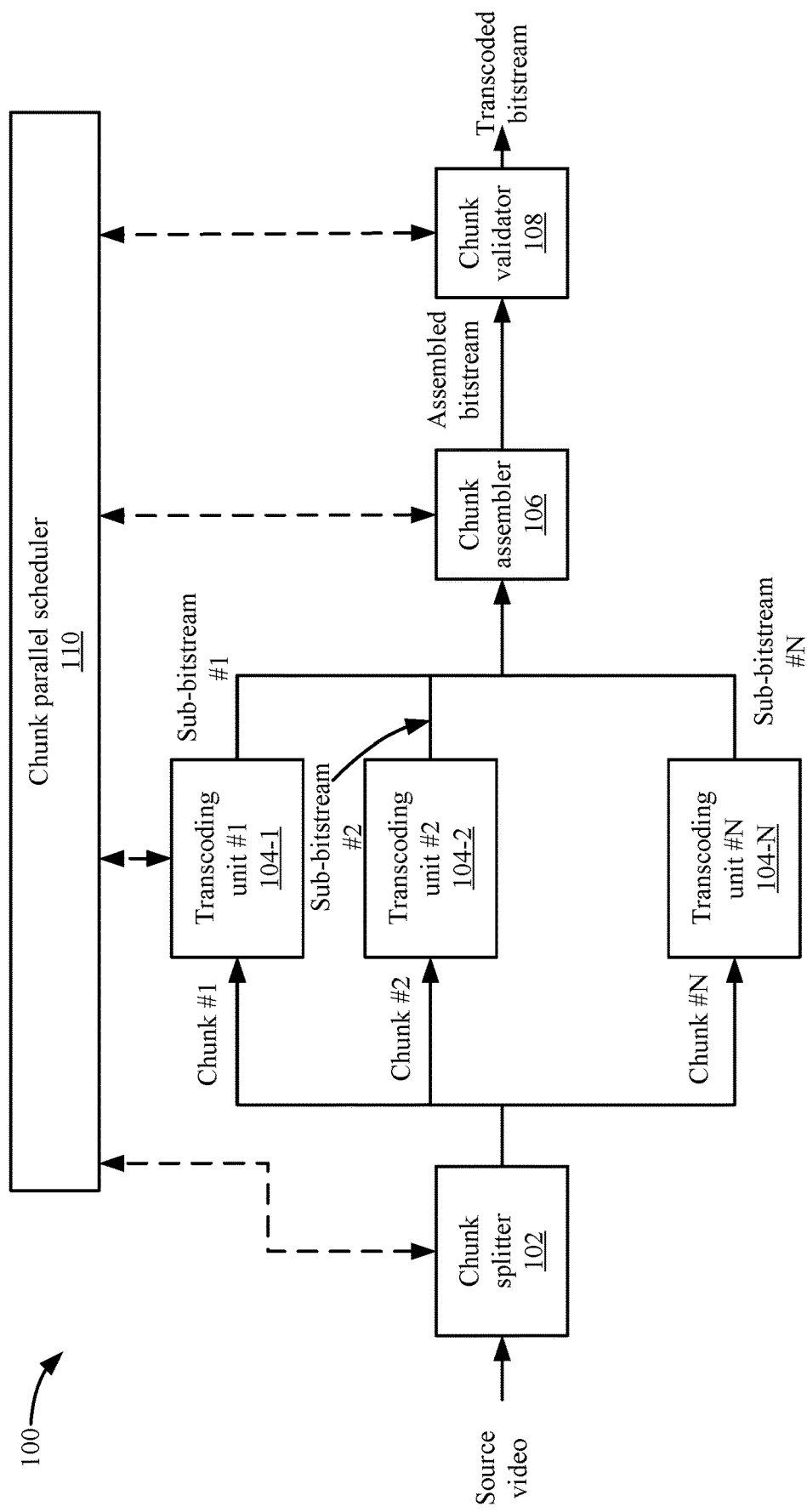
FIG. 1 depicts a simplified system for performing chunk parallel transcoding according to some embodiments.

FIG. 1 depicts a simplified system 100 for performing chunk parallel transcoding according to some embodiments. System 100 transcodes a source video asset, which may be any type of video, such as for a television show, movie, or video clip. The source video may need to be transcoded into one or more formats, such as one or more bitrates, and also within a certain time, such as within 24 hours of receiving the video. To increase the quality of the transcoding for the source video, system 100 may use the chunk parallel transcoding techniques described herein.

A chunk splitter 102 receives the source video and can split the source video into multiple chunks. A chunk may be a portion of video in the source video. For example, chunk splitter 102 may receive a file with the source video that is the full length of the video and then split the video into multiple chunks.

In some examples, chunk splitter 102 may first determine chunk boundaries for the source video. A chunk may define a boundary for the chunk that will be transcoded by one of transcoding units 104-1 to 104-N. A chunk may include a left boundary that defines the starting point of the chunk and a right boundary that defines the end of the chunk. The chunks may be formed at shots, scenes, or other boundaries found in the video.

Transcoding units 104 may be a software video processor/transcoder configured on a computer processing unit (CPU), a hardware accelerated video processor/transcoder with a graphical processing unit (GPU), or field programmable gate array (FPGA), and/or a hardware processor/transcoder implemented in an application-specific integrated circuit (ASIC). Each transcoding unit 104 may be situated in a different device, in the same device, or combined into multiple devices. In some embodiments, a number of transcoding units 104 in a cloud computing environment can be configured depending on the number of chunks output by chunk splitter 102. Transcoding may be the conversion from one digital format to another digital format. Transcoding may involve decoding the source format and transcoding the source video into another digital format, or converting the source video into videos with a specific resolution, framerate, bitrate, codec, etc. Also, transcoding may be the conversion of analog source content and to a digital format. As used, the term transcoding may include encoding.

Transcoding units #1 to #(N) (104-1 to 104-N) receive the chunks and transcode the chunks in parallel. For example, transcoding unit #1 receives a chunk #1; transcoding unit #2 receives a chunk #2; and transcoding unit #(N) receives a chuck #(N). Although transcoding units may process only one chunk per source video, it is possible that transcoding units 104 may process more than one chunk per source video. However, for a complete parallel transcoding, the number of chunks may equal the number of transcoding units 104.

A transcoding unit 104 may receive a chunk of video and encode that chunk multiple times using different parameters. For example, transcoding unit 104 transcodes the same chunk to generate multiple versions of the chunk at different quality levels and bitrates. The characteristics of the chunk may lead to versions of the chunk having different quality levels and bitrates. For example, some chunks may experience an increase or decrease in quality when a transcoding parameter is adjusted. The parameters including but not limited to the target bitrate, quality factor like Quantization Parameter (QP) or Constant Rate Factor (CRF), resolution, framerate, frame type, frames' structure, and other transcoder configurations. Then, transcoding units 104 output sub-bitstreams with the different transcoding passes of the chunk.

Each of the transcoding units 104 may perform the multiple pass transcoding of a different chunk. In other examples, one of the transcoding units 104 may transcode multiple chunks, or one of the transcoding units 104 may transcode all the chunks. However, transcoding the chunks in parallel may encode the video faster. In other embodiments, transcoding units 104 may transcode an entire video with different parameters. Then, the transcoded videos are split into sub-bitstream chunks.

A chunk assembler 106 receives N sub-bitstreams, such as one from each transcoding unit 104. Then, chunk assembler 106 assembles chunks from the sub-bitstreams to generate an assembled bitstream. The assembled bitstream is a single transcoded bitstream for the source video. Chunk assembler 106 selects one chunk from each of the sub-bitstreams according to a process that generates an optimal combination of chunks based on a target, such as a target quality desired for the final assembled bitstream. This process will be described in more detail below. Then, chunk assembler 106 assembles the selected chunks together into the assembled bitstream.

Chunk validator 108 receives the assembled bitstream and validates the bitstream. Validation by the chunk validator 108 may check the assembled bitstream based on different factors. For example, the factors may include completeness, correctness, overall quality, and cross-chunk quality. Completeness checks that there are no missing chunks, correctness checks that the chunks are in right order, overall quality checks the overall bitrate complies with any bitrate requirements, and cross-chunk quality checks a fluctuation of bitrate and quality across chunks are within pre-defined conditions.

Chunk parallel scheduler 110 may collect information from chunk splitter 102, transcoding unit 104, chunk splitter 106, and chunk validator 108 to coordinate the scheduling of the various stages of the transcoding of the source video. Chunk parallel scheduler 110 can coordinate the chunk parallel transcoding to achieve the optimal chunk parallel transcoding results. For example, chunk parallel scheduler 110 may schedule chunk splitter 102 to split the source video into chunks. Then, chunk parallel scheduler 110 configures the number of transcoding units 104 that are needed and schedules the transcoding at transcoding units 104. Thereafter, chunk parallel scheduler 110 schedules chunk assembler 106 to assemble the sub-bitstreams into an assembled bitstream. Then, chunk parallel scheduler 110 schedules chunk validator 108 to validate the assembled bitstream.

Chunk Generation

In some embodiments, chunk splitter 102 generates chunk boundaries for a source video using different processes. For example, fixed-length chunks and fixed-count chunks may be used. For the fixed-length chunks, chunk splitter 102 generates chunk boundaries every T seconds of the source video. For the fixed-count chunks process, given a fixed count of C, chunk splitter 102 generates chunk boundaries to generate C fixed-length chunks. It is possible that the last chunk may not be the same length as the other fixed-length chunks.

Other methods to generate chunk boundaries include using scene-change chunk boundaries, instantaneous decoder refresh (IDR) chunk boundaries, I frame boundaries, or fixed-size/similar-size chunk boundaries. For the scene-change chunk boundaries, chunk splitter 102 analyzes the source video to determine when scene changes occur. For example, scene changes may be when a large amount of content changes in the video because the scene changes from one location to another location. Also, the scene-change chunks may be determined at different camera shots. In some embodiments, chunk splitter 102 generates chunk boundaries in source video to generate variable length chunks based on when boundaries of scene changes occur.

IDR frames exist in certain transcoding protocols, such as H.264/AVC, Motion Pictures Experts Group (MPEG) 4, etc. An IDR frame may be a first picture that is transcoded in a group of pictures that are transcoded together. Although an IDR frame is described, other frames may be used, such as an I frame. Typically, an IDR frame or an I-frame may be transcoded without reference to any other frames. Chunk splitter 102 may determine the position of IDR frames and then generate chunk boundaries in the source video using the position of IDR frames as boundaries. The resulting chunks may be of variable length depending on the DR position in the source video. The size of each chunk will not be identical since the chunk boundary may happen at the instance when IDR frames occur.

The fixed-size or similar-size chunks are different from the fixed-length chunk in that the size of the chunks does not depend on the length. That is, the size may be the number of bytes in the chunk. The size may be used when the network transition efficiency of the chunks is optimized because the network can deliver chunks of the same size. Chunk splitter 102 generates chunk boundaries every T bytes of source video.

As discussed above, a video is composed of sequential camera shots, which may contain diverse video characteristics, such as luminance, scenario, subjects, texture, motion, etc. From a video coding perspective, an optimal transcoding process is to apply different transcoding parameters onto different shots to get the best compression results. However, the optimal transcoding process may not meet a target requirement for the video. For example, the optimal transcoding process may have the highest possible quality, but the overall bitrate of the video may be higher than desired. However, given all the different versions of each chunk, selecting the optimal combination is a time-consuming process. Accordingly, some embodiments efficiently select an optimal combination that meets a target. The selection also globally considers the different combinations of multiple chunks before selecting one version of a chunk using concept that considers a rate of the quality and bitrate between different versions of the chunks as will be described below.

Figure 2:
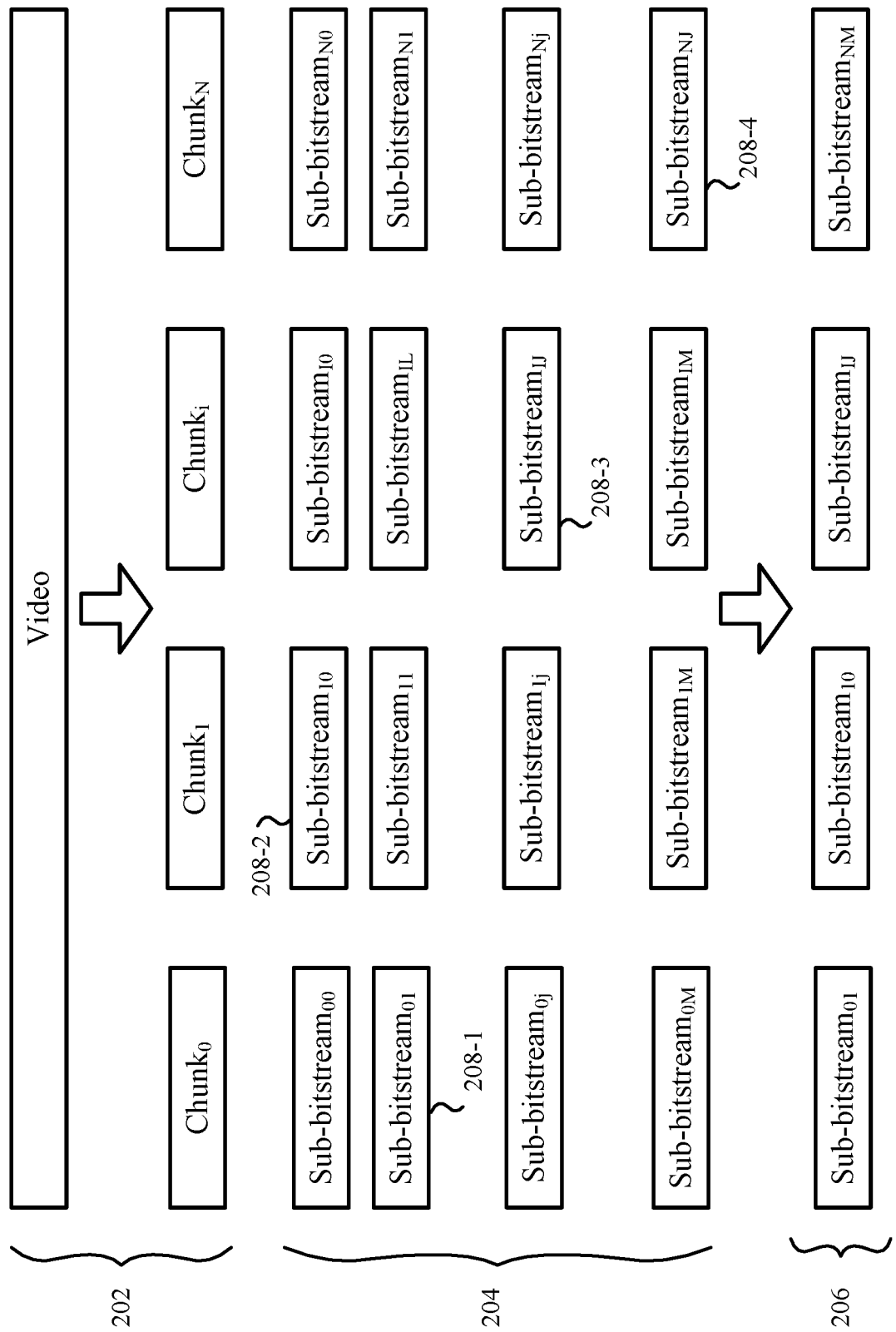
FIG. 2 depicts an example of the process for generating the optimal encoded bitstream according to some embodiments.

FIG. 2 depicts an example of the process for generating the optimal encoded bitstream according to some embodiments. At 202, a video is split into multiple chunks. A chunk may be a portion of the video and chunks are sequentially found in the video and then referenced as $Chunk_0$, $Chunk_1$ ..., $Chunk_i$, ..., $Chunk_N$. At 204, transcoding units 104 have transcoded each chunk into multiple sub-bitstreams. A sub-bitstream is a transcoding of a chunk using different transcoding parameters.

Each sub-bitstream chunk is represented by an identifier in FIG. 2, which includes a subscript of "XN", such as "00", "01", "10", "11", etc. The first number of the subscript identifier identifies the chunk location in the video, such as number three is the third sequential chunk in the video. The second number refers to the transcoding pass that was performed using different transcoding parameters. Taking the process in transcoding unit #0 as an example, the first pass transcoding results for $Chunk_0$ is identified as sub-bitstream$_{00}$, and the second pass transcoding results for $Chunk_0$ is identified as sub-bitstream$_{01}$.

After generating the sub-bitstreams, at 206, chunk assembler 106 generates an optimal combination of chunks from the sub-bitstreams. The process for selecting a chunk from a sub-bitstream will be described in more detail below. In this example, chunk assembler 106 has selected a chunk from sub-bitstream$_{01}$ at 208-1; a second chunk from sub-bitstream$_{10}$ at 208-2; a chunk from sub-bitstream$_{IJ}$ at 208-3; and a chunk from sub-bitstream$_{NJ}$ at 208-4. A chunk has been selected for each portion of the video. At 206, the selected chunks form an encoded bitstream. Selecting the chunks from the different bitstreams requires chunk assembler 106 to analyze many different variables. The following will now describe the chunk combination process to select these chunks.

Optimal Chunk Combination Process

Figure 3:
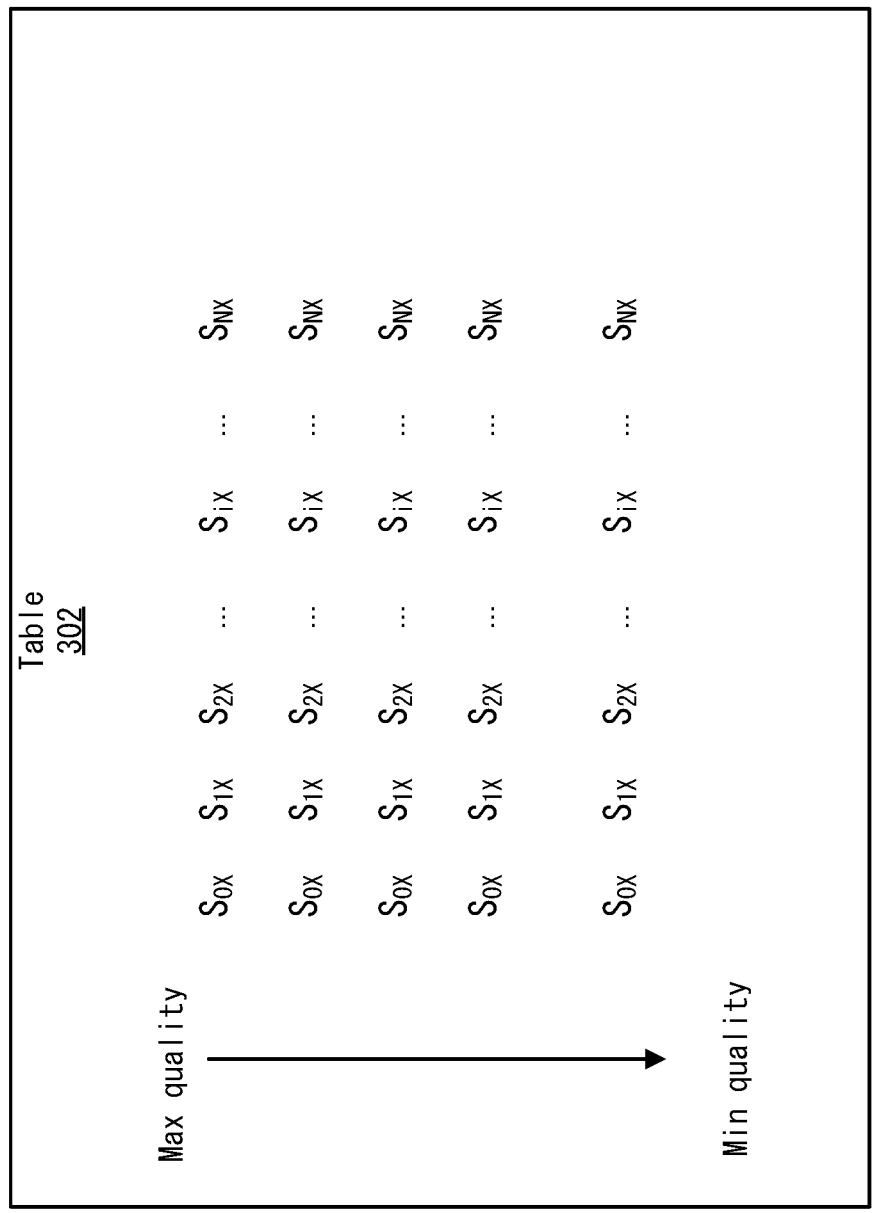
FIG. 3 shows a table that lists the chunks from the sub-bitstreams according to some embodiments.

FIG. 3 shows a table 302 that lists the chunks from the sub-bitstreams according to some embodiments. Each chunk in a sub-bitstream may have different characteristics, such as a different quality measurement and bitrate. The quality measurement may be based on one or more characteristics, such as quantization parameter, resolution, frame rate, frame type, frame structure, etc. Chunk assembler 106 may rank each sub-bitstream chunk based on quality, such as one of the quality measurements or a combination of quality measurements.

In table 302, the sub-bitstream chunks are shown from a maximum quality to a minimum quality. A sub-bitstream chunk may be referred to as $S_{XX}$, where "XX" may be two numbers. The first number may indicate the chunk number and the second number indicates the transcoding pass number. The second number is represented by "X" in table 302 for all sub-bitstream chunks because the order from maximum quality to minimum quality may vary. For example, for the first chunk $S_{0X}$, the maximum quality sub-bitstream chunk may be the first transcoding pass and for the second sub-bitstream chunk $S_{1X}$, the maximum quality sub-bitstream chunk may be from the fifth transcoding pass, and so on.

There are $M^N$ combinations of sub-bitstream chunks. That is, combining one chunk from each sub-bitstream results in $M^N$ different possible combinations that chunk assembler 106 analyzes to select a combination for the final encoded bitstream. In the combinations, there is a maximum quality referred to as quality$_{max}$ and a minimum quality that is referred to as quality$_{min}$. The following shows a formula that represents the maximum quality and the minimum quality:

$$quality_{max} = \frac{\sum_{i=0}^{N} quality(S_{i0})}{N}$$

$$quality_{min} = \frac{\sum_{i=0}^{N} quality(S_{iM})}{N}$$

The maximum quality is represented by the sum of the chunks on the first row of table 302 and the minimum quality is represented by the sum of the chunks on the last row of table 302. However, the maximum quality or minimum quality may not meet a target set for the video. Rather, some other combination of chunks with a quality in between the maximum quality and the minimum quality may be needed to meet the target. That is, the process of generating a bitstream may be more complicated than just selecting the sub-bitstream chunks that form the maximum quality bitstream because the maximum quality bitstream may have characteristics that make it unfeasible for using that combination, such as having a bitrate that is too high. Also, using adaptive bitrate delivery, a video delivery system may require that the video be transcoded into multiple bitstreams at different quality levels (and/or bitrates). The video delivery system may attempt to achieve a certain quality level within a bitrate range, such as a low, medium, and high bitrate range may have specified quality levels. Accordingly, chunk assembler 106 attempts to select sub-bitstream chunks that include the lowest bitrate but meet the target quality level for the bitstream. Chunk assembler 106 chooses a combination of sub-bitstream chunks whose overall quality meets the target but has a lowest possible bitrate.

Target Quality

The target quality may be quantified by different metrics or a combination of metrics, such as objective metrics or subjective metrics. The objective metrics may be signal-to-noise ratio, such as peak signal-to-noise ratio (PSNR), structural similarity index (SSIM), video multi-method assessment fusion (VMAF), etc. PSNR may measure the ratio between the maximum possible power of a signal and the power of corrupting noise. SSIM may predict the perceived quality of the resulting video. VMAF may be a video quality metric based on a reference in a distorted video sequence. A subjective quality may be a test score that is generated based on some algorithm.

Different examples of target qualities will be described. One target quality may be the total quality of the transcoded bitstream. Another target quality may be an average quality of the transcoded bitstream. One average quality may be the average quality of the middle sub-bitstream in every chunk, which may be represented by the following formula:

$$\text{basic\_target\_quality} = \frac{\sum_{i=0}^{N} \text{quality}(S_{i,ceiling(\frac{M}{2})})}{N}$$

Another target quality may be the average quality of the sub-bitstream chunks for every chunk that corresponds to a predefined default transcoding pass. For example, the $k^{th}$ pass transcoding for each chunk can be set as the predefined default transcoding pass, which will generate the sub-bitstream$_{0k}$, sub-bitstream$_{1k}$, ..., sub-bitstream$_{Nk}$, where k is in range of [0, M]. The selection rule of the predefined default transcoding pass could be empirically decided or based on certain previous estimations. This average target quality may be defined as:

$$\text{average\_target\_quality} = \frac{\sum_{i=0}^{N} \text{quality}(S_{ik})}{N}$$

The target quality may be adjusted by a user where the adjustable range is called "delta" which may be represented by the following formula:

target_quality=min(max(basic_target_quality+delta, quality$_{min}$),quality$_{min}$)

The above equation may guarantee that the value for the target_quality is within the range of [quality$_{min}$, quality$_{max}$]. The parameter delta may be used to balance the final video transcoding quality versus the bitrate. The parameter delta may be derived during the transcoding process automatically or set by the user. For example, depending on the quality of the sub-bitstreams being produced, the basic target quality may be adjusted, such as if mostly lower quality chunks are being generated, then the basic target quality may be lowered. Or, the user may observe the quality being generated from the transcoding and set a different basic target quality.

Exchange Rate

Selecting the combination that meets the target quality requires testing different combinations. Chunk assembler 106 uses an exchange rate to evaluate which sub-bitstream chunk should be selected for each chunk from all of the sub-bitstreams. The exchange rate may be the rate of change between the quality and bitrate between an anchor sub-bitstream chunk and another sub-bitstream chunk (referred to as the current sub-bitstream chunk). The anchor sub-bitstream chunk and the current sub-bitstream chunk are for one chunk in the video, such as Chunk$_0$, but have been transcoded using different transcoding parameters. The exchange rate may be defined as follows:

$$\text{exchange\_rate}_{S_{ij}-S_{i(j+n)}} = \frac{\text{bitrate}(S_{ij}) - \text{bitrate}(S_{i(j+n)})}{\text{quality}(S_{ij}) - \text{quality}(S_{i(j+n)})} (n > 0)$$

The exchange rate between two sub-bitstream chunks may quantify a rate of change for how much bitrate is reduced per unit reduction of quality when replacing the anchored sub-bitstream chunk with the current sub-bitstream chunk, such as using a sub-bitstream chunk $S_{i(j+n)}$ to replace sub-bitstream chunk $S_{ij}$. Using the exchange rate allows chunk assembler 106 to globally evaluate all chunks and the effect of replacing sub-bitstream chunks in a combination. The exchange rate also allows chunk assembler 106 to select the optimal combination of sub-bitstream chunks faster with fewer comparisons as will be described in more detail below.

Figure 4:
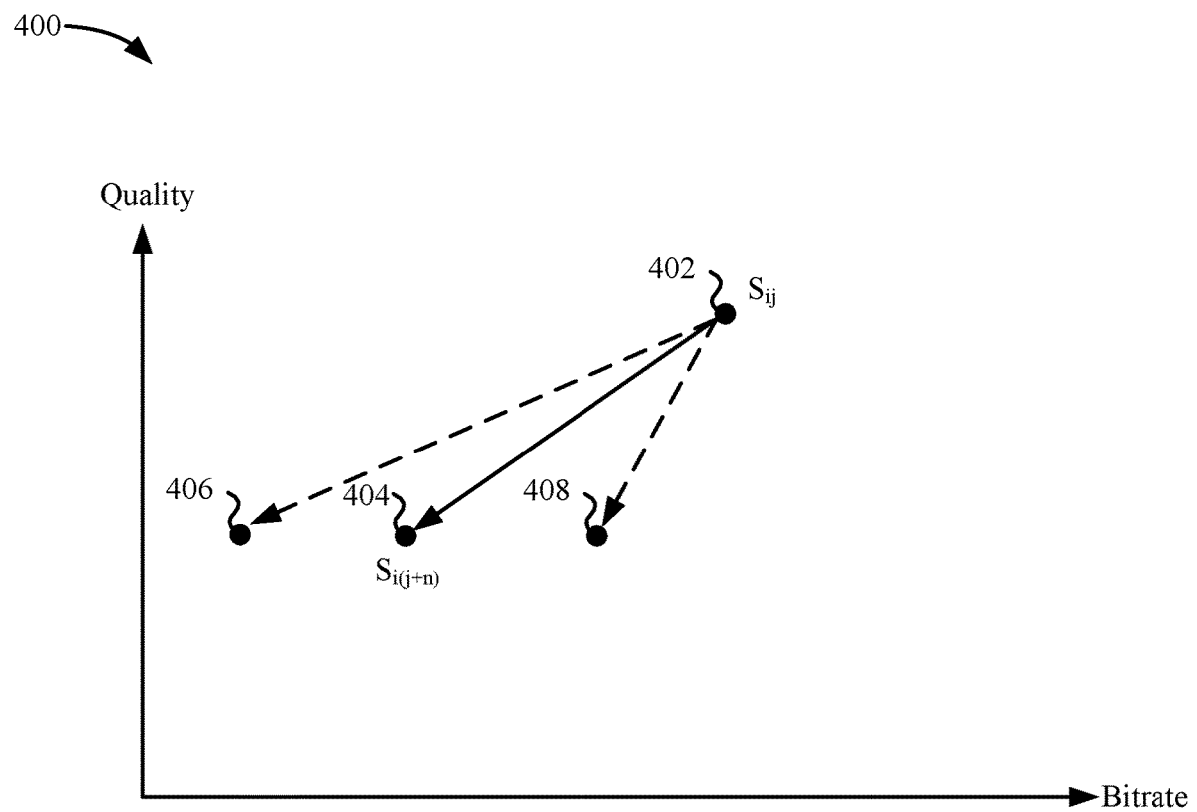
FIG. 4 depicts an example of a graph showing the exchange rate according to some embodiments.

FIG. 4 depicts an example of a graph 400 showing the exchange rate according to some embodiments. The X axis of graph 400 is bitrate and the Y axis of graph 400 is quality. At 402, an anchor sub-bitstream chunk $S_{ij}$ is the start point and the endpoint is a sub-bitstream chunk $S_{i(j+n)}$ at 404. The exchange rate may be equal to the slope of the line between point 402 and point 404. From the point at 402 to the point at 404, the quality is being reduced along with the bitrate. Accordingly, replacing the anchor sub-bitstream chunk $S_{ij}$ with the other sub-bitstream chunk $S_{i(j+n)}$ will lower the quality in addition to the bitrate. The slope of the line may determine how much quality is reduced versus how much bitrate is reduced.

In some embodiments, chunk assembler 106 attempts to select a sub-bitstream chunk that reduces quality, but also reduces bitrate the most. For instance, the slope of a line from a point 402 to a point 406 may reduce the same amount of quality as point 404 but reduces the bitrate even further than point 404. This may be more desirable as the same amount of reduction in quality results in even more reduction in bitrate. However, the slope of the line from a point 402 to a point 408 reduces the same amount of quality as point 404, but with less reduction in bitrate. Accordingly, replacing the anchor sub-bitstream chunk with a chunk at point 408 will not reduce the bitrate as much, but results in the same quality reduction. A smaller reduction in the bitrate for the same amount of quality reduction is less desirable than reducing the quality the same amount with a larger bitrate reduction because a lower bitrate uses less bandwidth when sending the video to a client device.

Figure 5:
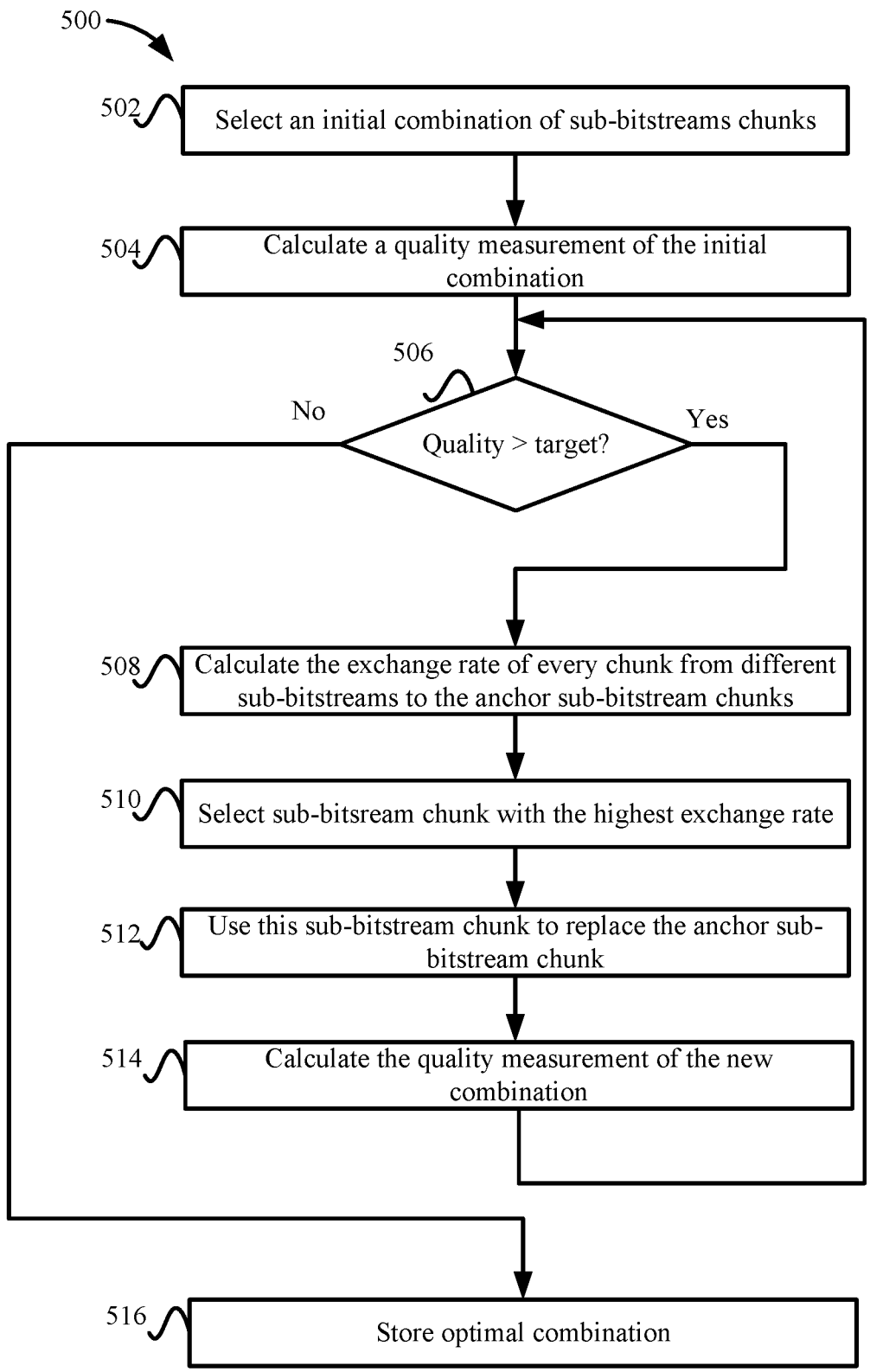
FIG. 5 depicts a simplified flowchart of a method for selecting sub-bitstream chunks for the encoded bitstream according to some embodiments.

The exchange rate value is a measurement that quantifies the slope for exchanging the anchor sub-bitstream chunk with another sub-bitstream chunk. In some embodiments, using the exchange rate, chunk assembler 106 selects different sub-bitstream chunks that have the smallest slope to generate the encoded bitstream. FIG. 5 depicts a simplified flowchart 500 of a method for selecting sub-bitstream chunks for the encoded bitstream according to some embodiments. At 502, chunk assembler 106 selects an initial combination of sub-bitstream chunks. The initial combination may be the first sub-bitstream chunk from each sub-bitstream, such as sub-bitstream chunks $S_{00}$, $S_{10}$, $S_{20}$, ..., $S_{N0}$. The first sub-bitstream chunk in table 302 has the highest quality. However, other initial combinations may be used, such as a random selection of sub-bitstream chunks, the middle quality sub-bitstream chunks, and the lowest quality sub-bitstream chunks, etc.

At 504, chunk assembler 106 calculates the quality of the initial combination. Chunk assembler 106 calculates the quality based on how the target quality that was defined. For example, if the target quality is the average quality for the entire combination, chunk assembler 106 calculates the average quality of the combination, but other quality measurements may be used. At 506, chunk assembler 106 determines if the quality measurement meets the target quality. In some examples, chunk assembler 106 determines if the quality measurement is greater than the target quality. If the quality measurement is not greater than the target quality, then the combination meets the requirement of the target quality and at 516, chunk assembler 106 can store the combination as the optimal combination. However, if the quality is greater than the target quality, then chunk assembler 106 needs to reduce the target quality by replacing the one or more of the sub-bitstream chunks.

Figure 6:
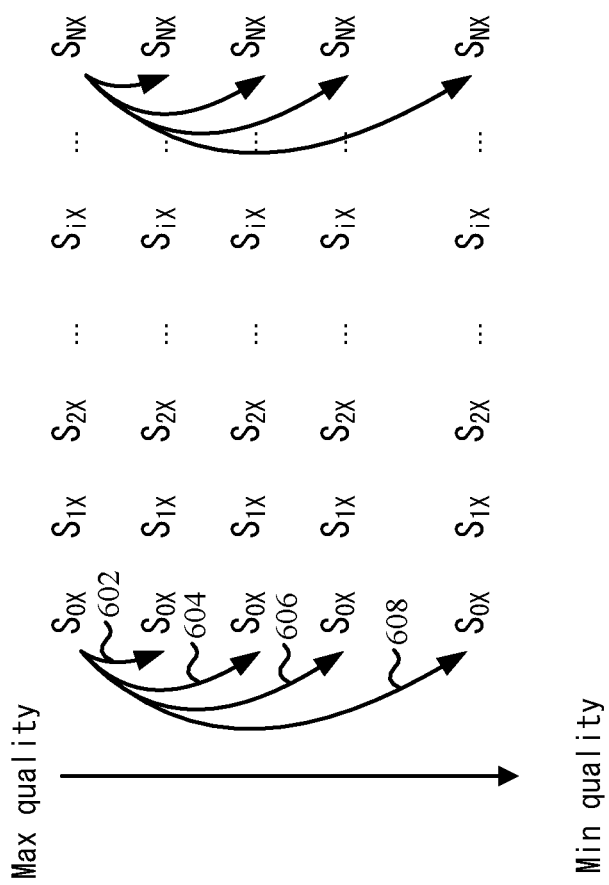
FIG. 6 depicts an example of determining the exchange rates between sub-bitstream chunks according to some embodiments.

Accordingly, at 508, chunk assembler 106 calculates an exchange rate for chunks from different sub-bitstreams to the anchor sub-bitstream chunks. FIG. 6 depicts an example of determining the exchange rates between sub-bitstream chunks according to some embodiments. One anchor sub-bitstream chunk may be sub-bitstream chunk $S_{0X}$. Combinations between other sub-bitstream chunks are shown at 602, 604, 606, and 608. Chunk assembler 106 may calculate the exchange rates between the anchor sub-bitstream chunk and other sub-bitstream chunks for chunk $S_{0X}$. Similarly, chunk assembler 106 performs this calculation for all other anchor chunks in the video, such as anchor chunk $S_{1X}$, chunk $S_{2X}$, chunk $S_{iX}$, chunk $S_{NX}$.

Figure 7A:
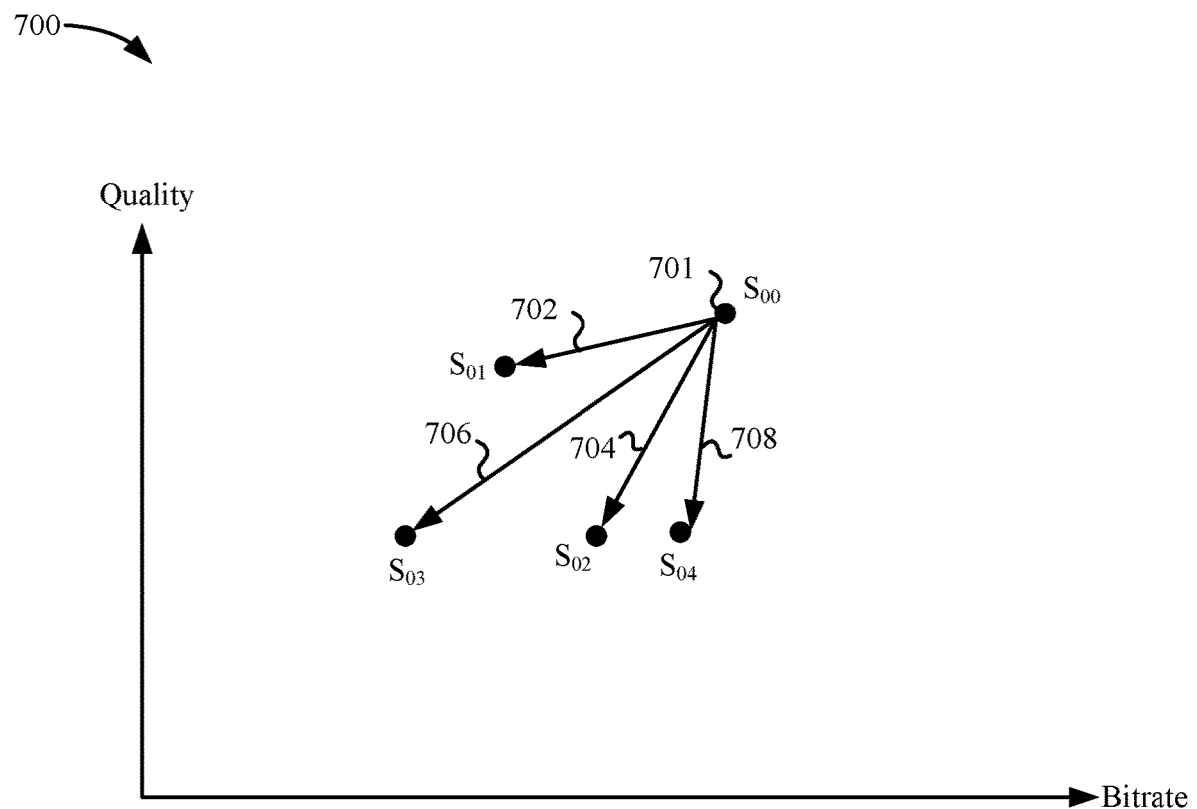
FIG. 7A depicts a graph showing the exchange rates from an anchor sub-bitstream chunk $S_{00}$ to other sub-bitstream chunks $S_{01}$, $S_{02}$, $S_{03}$, and $S_{04}$ according to some embodiments.

FIG. 7A depicts a graph 700 showing the exchange rates from an anchor sub-bitstream chunk $S_{00}$ to other sub-bitstream chunks $S_{01}$, $S_{02}$, $S_{03}$, and $S_{04}$ according to some embodiments. The different exchange rates may be represented by the slope of the lines from a point 701 to points 702, 704, 706, and 708. When selecting one of the sub-bitstream chunks, chunk assembler 106 selects the sub-bitstream chunk that is associated with the biggest exchange rate, which means the exchange rate has the smallest slope in graph 700. This means that replacing the anchor sub-bitstream chunk $S_{00}$ with another sub-bitstream chunk may result in the most bitrate reduction with the same loss of quality compared to the other sub-bitstream chunks. In some examples, the quality may not be exactly the same and in such cases, chunk assembler 106 selects the sub-bitstream chunk that is associated with the biggest exchange rate or smallest slope to reduce the quality the least with the most reduction in bitrate. Chunk assembler 106 selects the sub-bitstream chunk that results in the smallest reduction in quality with the greatest reduction in bitrate such that the iterative process can ultimately result in reaching the target quality with the most reduction in bitrate.

Figure 7B:
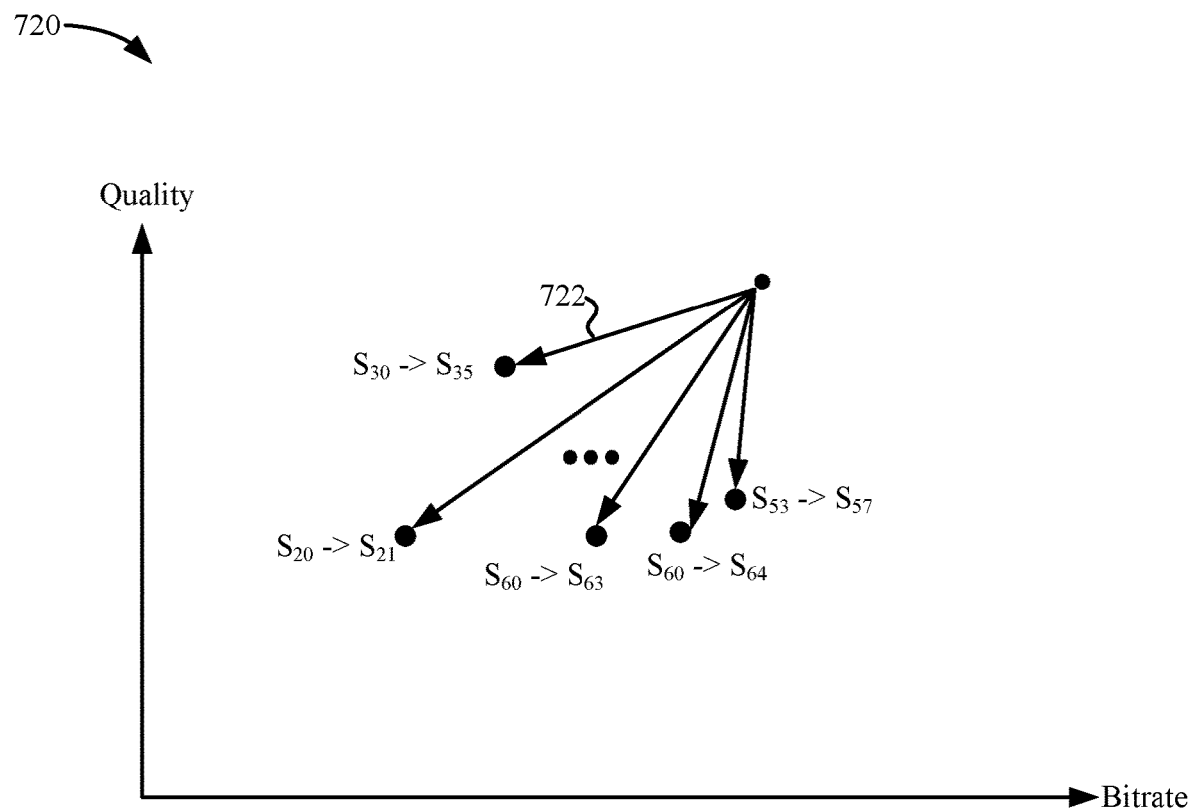
FIG. 7B shows a graph of an example of various sub-bitstream chunk combinations from a certain set of anchor chunks according to some embodiments.

FIG. 7A shows one case in which only one chunk and corresponding sub-bitstream chunks are considered. However, in other scenarios, chunk assembler 106 may consider all of the sub-bitstream chunk combinations for all anchor chunks together. FIG. 7B shows a graph 720 of an example of various sub-bitstream chunk combinations from a certain set of anchor chunks according to some embodiments. Although all exchange rates are not shown, some representative exchange rates are shown from different anchor sub-bitstream chunks to other sub-bitstream chunks. The identifiers $S_{XX} \rightarrow S_{YY}$ represent the identifier for an anchor sub-bitstream chunk to an identifier for another sub-bitstream chunk.

Chunk assembler 106 may select the combination of sub-bitstream chunks that includes the greatest exchange rate as shown at 722. This combination is from an anchor sub-bitstream chunk $S_{30}$ to a sub-bitstream chunk $S_{35}$. This replaces the third sub-bitstream chunk of the video from the first transcoding pass #0 with the third sub-bitstream chunk from the transcoding pass #5. If chunk assembler 106 selects one of the other sub-bitstream chunks to exchange, the quality reduction may be bigger than desired, and the highest quality combination with the lowest bitrate may not be calculated. Further, if there are other combinations that result in the same quality reduction, chunk assembler 106 selects the combination with the largest reduction in bitrate.

Referring back to FIG. 5, at 510, chunk assembler 106 selects a sub-bitstream chunk with the highest exchange rate. At 512, chunk assembler 106 uses the selected sub-bitstream chunk to replace the anchor sub-bitstream chunk. In the above example, sub-bitstream $S_{30}$ is replaced by sub-bitstream chunk $S_{35}$ in the combination of sub-bitstream chunks. In some embodiments, chunk assembler 106 only replaces a single sub-bitstream chunk in the combination of sub-bitstream chunks. Chunk assembler 106 may only replace one sub-bitstream chunk because that the single exchange may result in an optimal combination, which results in the minimum number of calculations to find the optimal combination. Also, the exchange rate decision is based on a table listing the exchange rates. Every time one exchange occurs, the newly selected sub-bitstream chunk will update a portion of exchange rate table.

Figure 7C:
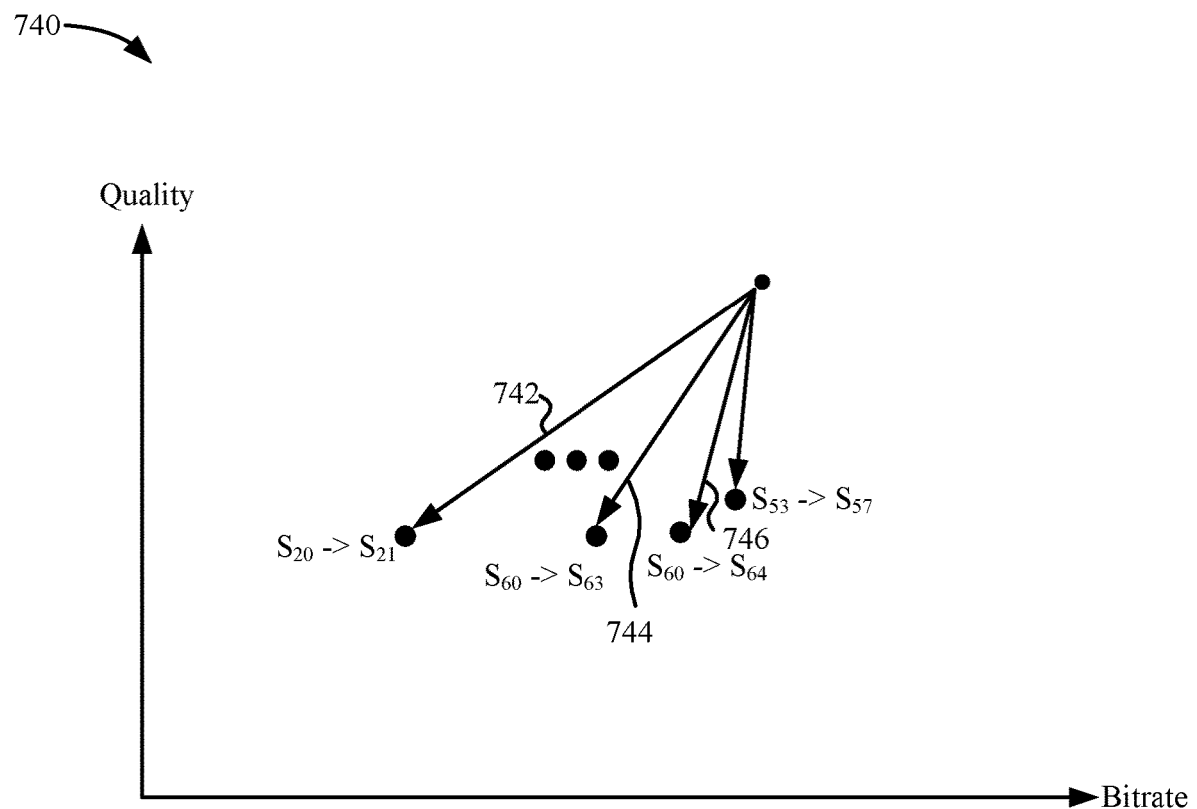
FIG. 7C depicts a graph that shows an example of selecting another sub-bitstream chunk according to some embodiments.

At 514, chunk assembler 106 calculates a quality measurement for the new combination. The process then reiterates to 506 to determine whether the quality measurement is greater than the target quality. If the quality measurement is still greater than the target quality, the process continues at 508, 510, 512, and 514. FIG. 7C depicts a graph 740 that shows an example of selecting another sub-bitstream chunk according to some embodiments. The sub-bitstream chunk combination from sub-bitstream chunk $S_{30}$ to sub-bitstream chunk $S_{35}$ has been eliminated because sub-bitstream chunk $S_{35}$ has replaced the anchor sub-bitstream chunk $S_{30}$ in the combination. The remaining sub-bitstream chunk exchange rates remain, however. The exchange rates for the replaced chunk changes. For example, if chunk #2 is changed, e.g., sub-bitstream chunk 2x is switched to sub-bitstream_chunk 2y, chunk assembler 106 updates the exchange rate related to chunk #2 based on the new anchor chunk of sub-bitstream chunk 2y. Chunk 2x may be Chunk #2 with the transcoding pass of "x" and Chunk 2y may be Chunk #2 with the transcoding pass of "y". Before the exchange, an exchange rate table contains the exchange rates of {2x to 2x+1, 2x to 2x+2, etc.} for chunk #3. This uses Chunk 2x as the anchor chunk when determining the exchange rates. After the exchange, chunk assembler 106 updates these exchange rate entries to {2y to 2y+1, 2y to 2y+2, etc.}. This uses Chunk 2y as the anchor chunk when determining the exchange rates. Chunk assembler 106 selects the next replacement sub-bitstream chunk that has the highest exchange rate. For example, at 742, the sub-bitstream chunk $S_{21}$ is selected to replace the anchor sub-bitstream chunk $S_{20}$ for the second chunk of the combination. This reduces the quality with the largest reduction of bitrate. Some other possible exchanges at 744 and 746 result in the same quality reduction, but less reduction in bitrate. Chunk assembler 106 does not select these exchanges because the exchange at 742 is considered better because the exchange at 742 has more bitrate reduction with the same quality reduction. Chunk assembler 106 then compares the new quality measurement with the target quality and the above process continues until the target bitrate is reached. Referring back to FIG. 5, at 516, chunk assembler 106 stores the optimal combination when it is determined.

Figure 8:
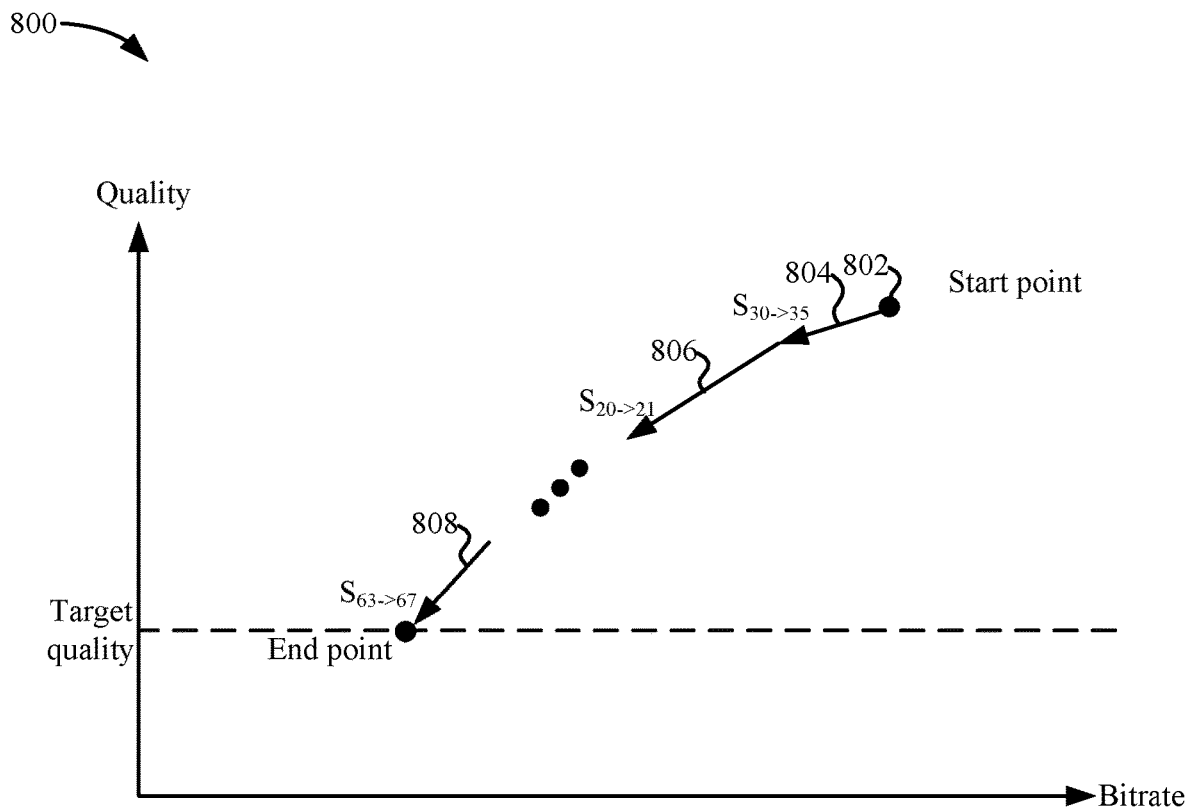
FIG. 8 shows an example of the selection of replacement sub-bitstream chunks according to some embodiments.

FIG. 8 shows a graph 800 of an example of the selection of replacement sub-bitstream chunks according to some embodiments. The starting point at 802 shows a quality and bitrate measurement for the combination. At 804, the selection of sub-bitstream chunk $S_{35}$ to replace sub-bitstream chunk $S_{30}$ reduces the quality and bitrate as shown. Then, at 806, the lines show the reduction of quality and bitrate that occurs when sub-bitstream chunk $S_{21}$ replaces sub-bitstream chunk $S_{20}$. Then, finally, at 808, the quality and bitrate reductions meet the target quality when sub-bitstream chunk $S_{67}$ replaces sub-bitstream chunk $S_{63}$.

Chunk assembler 106 replaces the sub-bitstream chunks continuously until the quality measurement of the combination meets the target quality. Meeting the target quality may be equal to the target quality, less than the target quality, greater than the target quality, or other ways of meeting the target quality. The end point of the final combination may be the optimal combination of sub-bitstreams as measured by the target quality. That is, the optimal combination meets the target quality with the most reduction in bitrate that is possible to meet the target quality.

The following describes pseudocode for some embodiments:

```
Begin
combinational_state <- {0, 0, 0, . . . , 0}
quality_cur <- avg_quality(combinational_state)
for i <- 0 to N
   for j <- 0 to M
```

$$\text{exchange\_rate}[i, 0, j] \leftarrow \frac{bitrate_{i,0} - bitrate_{i,j}}{quality_{i,0} - quality_{i,j}}$$

```
   end for
end for
while quality_cur > target do
   max_rate <- max(exchange_rate)
   chunk_num <- max_rate[0]
   state_anchor <- max_rate[1]
   state_selected <- max_rate[2]
   combinational_state[chunk_num] = state_selected
   for j <- state_anchor to M
      del(exchange_rate[chunk_num, state_anchor, j])
   end for
   for j <- state_selected to M
```

$$\text{exchange\_rate}[\text{chunk\_num}, \text{state\_selected}, j] \leftarrow \frac{bitrate_{chunk\_num\_state\_selected} - bitrate_{chunk\_num\_j}}{quality_{chunk\_num\_state\_selected} - quality_{chunk\_num\_j}}$$

```
   end for
   quality_cur <- avg_quality(combinational_state)
end while
for i <- 0 to N
   print_combinational_state[i]
end for
End
```

CONCLUSION

Using the exchange rate improves the selection of the optimal combination of chunks to meet the quality target with the most bitrate reduction because chunk assembler 106 may not need to test every single combination. Further, chunk assembler 106 can determine the optimal combination faster because the exchange rates for all chunks are considered when generating the optimal combination. This is faster than locally optimizing one chunk at a time. Further, the resulting optimal combination may have a higher quality by globally optimizing the chunk quality.

System

Figure 9:
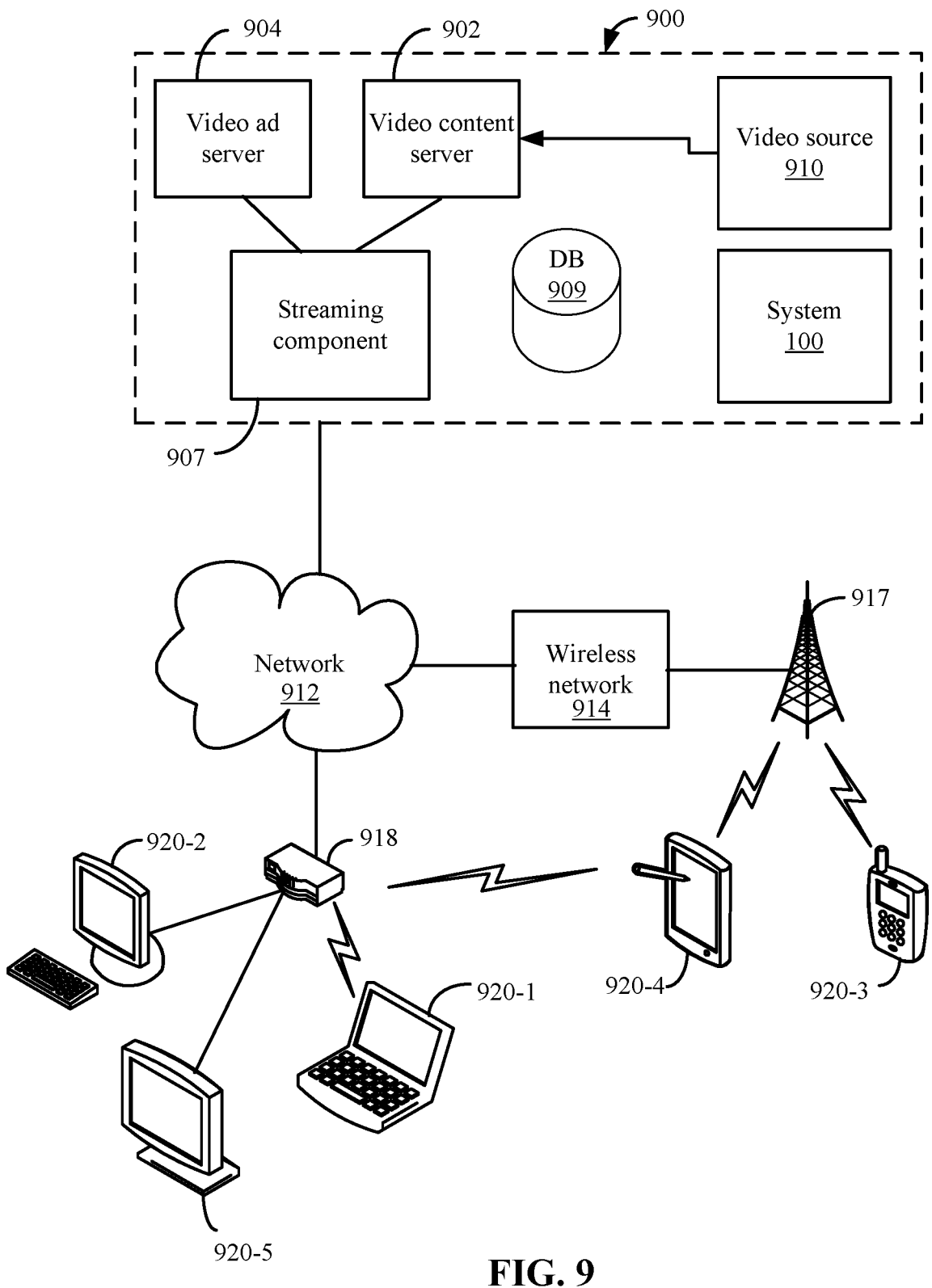
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and/or 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 900, a public service message, or some other information. The video advertising server 904 may serve the video advertising segments as directed by a user interface controller (not shown).

The video streaming system 900 also may include system 100.

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example, administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless cellular telecommunications network (WCS) 914, or some combination of these or similar networks.

One or more client devices 920 may be in communication with the video streaming system 900, via the data communication network 912, wireless cellular telecommunications network 914, and/or another network. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for a wireless cellular telecommunications network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HTTP and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
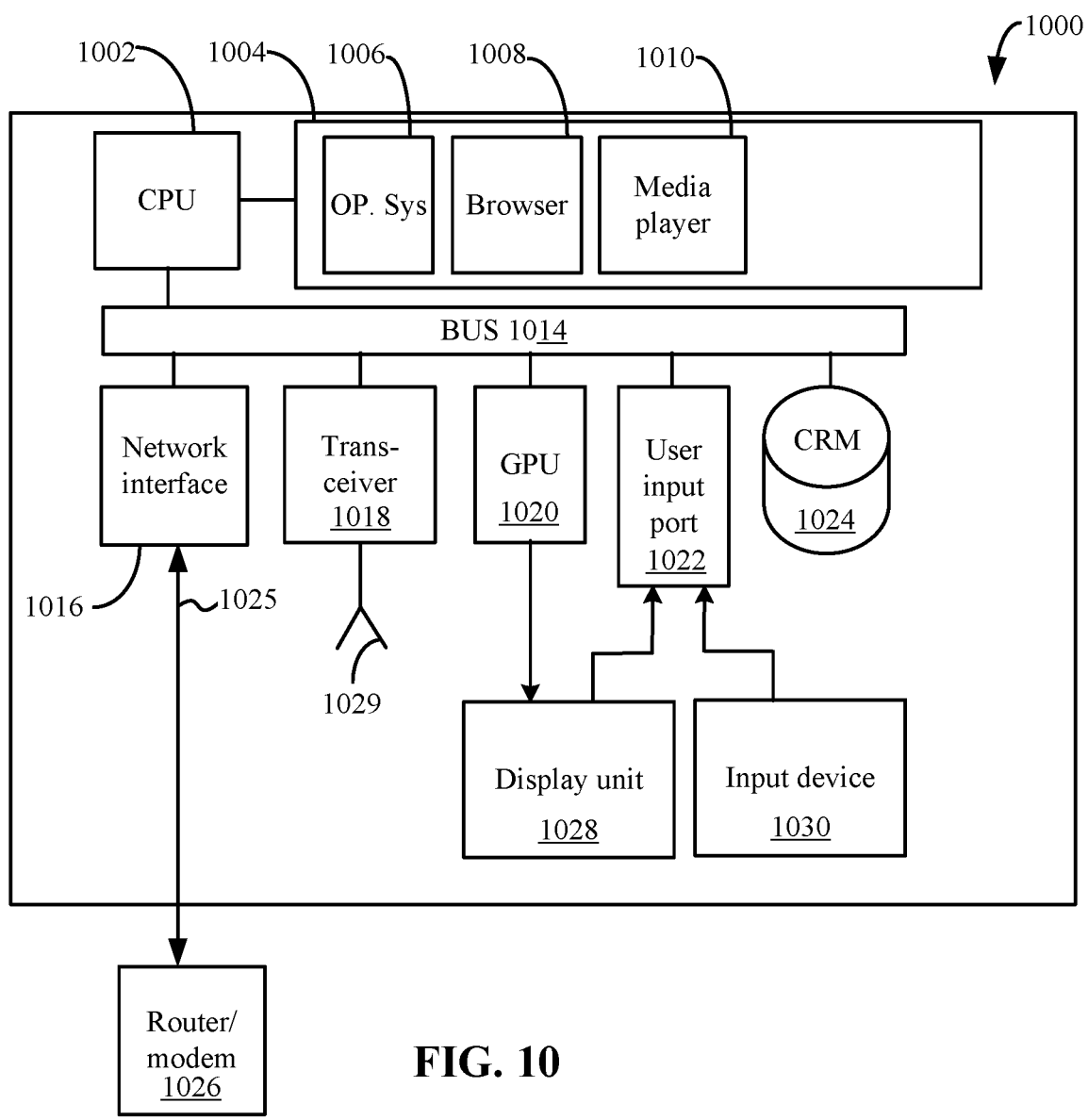
FIG. 10 depicts a diagrammatic view of an apparatus for viewing video content and advertisements.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules 1006, 1008, 1010 and 1012 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured to perform one or more operations of a method as described herein.

A communication interface 1016 may also be connected to the bus 1014. The communication interface 1016 may provide or support two-way data communication between the apparatus 1000 and one or more external devices, e.g., the streaming system 900, optionally via a router/modem 1026 and a wired or wireless connection. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device, a combination of sub-bitstream chunks from a plurality of sub-bitstreams for a video, the combination of sub-bitstream chunks being associated with a quality measurement;
   analyzing, by the computing device, relationships for exchanging sub-bitstream chunks in the combination of sub-bitstream chunks with sub-bitstream chunks from other sub-bitstreams, wherein a relationship is based on a change in bitrate to a change in quality due to the exchanging;
   exchanging, by the computing device, a sub-bitstream chunk in the combination of sub-bitstream chunks with another sub-bitstream chunk from another sub-bitstream in the plurality of sub-bitstreams based on analyzing the relationships;
   continuing, by the computing device, to exchange a sub-bitstream chunk in the combination of sub-bitstream chunks with another sub-bitstream chunk by analyzing remaining relationships until the quality measurement of the combination of sub-bitstream chunks meets a target quality; and
   outputting, by the computing device, the combination of sub-bitstream chunks.

2. The method of claim 1, wherein the relationship based on the change in bitrate to the change in quality due to the exchanging comprises how much bitrate will be reduced in relation to quality in the combination of sub-bitstream chunks due to the exchanging.

3. The method of claim 1, wherein continuing to exchange the sub-bitstream chunk in the combination of sub-bitstream chunks with another sub-bitstream chunk comprises:
   exchanging a different one of the sub-bitstream chunks in the combination of sub-bitstream chunks with another sub-bitstream chunk based on the relationship of the change in bitrate to the change in quality due to the exchanging.

4. The method of claim 1, wherein analyzing the relationships and/or exchanging the sub-bitstream chunk in the combination of sub-bitstream chunks with another sub-bitstream chunk comprise:
   quantifying how much bitrate will be reduced in relation to quality due to the exchanging for multiple possible exchanges of sub-bitstream chunks for the sub-bitstream chunk; and
   selecting the another sub-bitstream chunk based on the another bitstream chunk being associated with a highest quality and a lowest bitrate reduction in the combination of sub-bitstream chunks among the multiple possible exchanges.

5. The method of claim 1, wherein exchanging the sub-bitstream chunk in the combination of sub-bitstream chunks with another sub-bitstream chunk comprises:
   selecting the another sub-bitstream chunk with a highest quality from multiple sub-bitstream chunks of the video.

6. The method of claim 1, wherein exchanging the sub-bitstream chunk in the combination of sub-bitstream chunks with another sub-bitstream chunk comprises:
   selecting the another sub-bitstream chunk from multiple sub-bitstream chunks that will reduce the quality measurement the least with the most amount of bandwidth reduction.

7. The method of claim 1, wherein analyzing the relationships and/or exchanging the sub-bitstream chunk in the combination of sub-bitstream chunks with another sub-bitstream chunk comprise:
   calculating an exchange rate that considers bitrate change divided by quality change for multiple exchanges of the sub-bitstream chunk with other sub-bitstream chunks in the plurality of sub-bitstream chunks; and
   selecting the sub-bitstream chunk that includes the exchange rate with a smallest slope when the exchange rate considers the bitrate change divided by the quality change.

8. The method of claim 1, wherein analyzing the relationships comprises:
   calculating a first difference in bitrate between the sub-bitstream chunk and the another sub-bitstream chunk;
   calculating a second difference in the quality measurement between the sub-bitstream chunk and the another sub-bitstream chunk; and
   using the first difference and the second difference to determine whether to exchange the sub-bitstream chunk in the combination of sub-bitstream chunks with the another sub-bitstream chunk.

9. The method of claim 1, wherein analyzing the relationships comprises:
   comparing how much bitrate will be reduced in relation to quality due to the exchanging of a plurality of sub-bitstream chunks.

10. The method of claim 1, wherein continuing to exchange the sub-bitstream chunk in the combination of sub-bitstream chunks with another sub-bitstream chunk until the quality measurement of the combination meets the target quality comprises:
    calculating a new quality measurement for the combination of sub-bitstream chunks after the exchanging; and
    comparing the new quality measurement to the target quality.

11. The method of claim 10, wherein continuing to exchange the sub-bitstream chunk in the combination of sub-bitstream chunks with another sub-bitstream chunk until the quality measurement of the combination meets the target quality comprises:
    when the new quality measurement meets the target quality, stopping the exchanging.

12. The method of claim 11, wherein continuing to exchange the sub-bitstream chunk in the combination of sub-bitstream chunks with another sub-bitstream chunk until the quality measurement of the combination meets the target quality comprises:
    when the new quality measurement does not meet the target quality, exchanging a further sub-bitstream chunk in the combination of sub-bitstream chunks with another sub-bitstream chunk.

13. The method of claim 1, further comprising:
    transcoding the video into the plurality of sub-bitstreams, wherein each sub-bitstream is transcoded using a different set of transcoding parameters.

14. The method of claim 1, further comprising:
transcoding each chunk of the video into the plurality of sub-bitstreams, wherein each sub-bitstream transcodes a chunk using a different set of transcoding parameters.

15. The method of claim 1, further comprising:
using the combination of sub-bitstream chunks as a transcoded version of the video.

16. A non-transitory computer-readable storage medium containing instructions, that when executed, control a computer system to be configured for:
determining a combination of sub-bitstream chunks from a plurality of sub-bitstreams for a video, the combination of sub-bitstream chunks being associated with a quality measurement;
analyzing relationships for exchanging sub-bitstream chunks in the combination of sub-bitstream chunks with sub-bitstream chunks from other sub-bitstreams, wherein a relationship is based on a change in bitrate to a change in quality due to the exchanging;
exchanging a sub-bitstream chunk in the combination of sub-bitstream chunks with another sub-bitstream chunk from another sub-bitstream in the plurality of sub-bitstreams based on analyzing the relationships;
continuing to exchange a sub-bitstream chunk in the combination of sub-bitstream chunks with another sub-bitstream chunk by analyzing remaining relationships until the quality measurement of the combination of sub-bitstream chunks meets a target quality; and
outputting the combination of sub-bitstream chunks.

17. The non-transitory computer-readable storage medium of claim 16, wherein the relationship based on the change in bitrate to the change in quality due to the exchanging comprises how much bitrate will be reduced in relation to quality in the combination of sub-bitstream chunks due to the exchanging.

18. The non-transitory computer-readable storage medium of claim 16, wherein analyzing the relationships and/or exchanging the sub-bitstream chunk in the combination of sub-bitstream chunks with another sub-bitstream chunk comprise:
quantifying how much bitrate will be reduced in relation to quality due to the exchanging for multiple possible exchanges of sub-bitstream chunks for the sub-bitstream chunk; and
selecting the another sub-bitstream chunk based on the another bitstream chunk being associated with a highest quality and a lowest bitrate reduction in the combination of sub-bitstream chunks among the multiple possible exchanges.

19. The non-transitory computer-readable storage medium of claim 16, wherein analyzing the relationships and/or exchanging the sub-bitstream chunk in the combination of sub-bitstream chunks with another sub-bitstream chunk comprise:
calculating an exchange rate that considers bitrate change divided by quality change for multiple exchanges of the sub-bitstream chunk with other sub-bitstream chunks in the plurality of sub-bitstream chunks; and
selecting the sub-bitstream chunk that includes the exchange rate with a smallest slope when the exchange rate considers the bitrate change divided by the quality change.

20. An apparatus comprising:
one or more computer processors; and
a non-transitory computer-readable storage medium comprising instructions, that when executed, control the one or more computer processors to be configured for:
determining a combination of sub-bitstream chunks from a plurality of sub-bitstreams for a video, the combination of sub-bitstream chunks being associated with a quality measurement;
analyzing relationships for exchanging sub-bitstream chunks in the combination of sub-bitstream chunks with sub-bitstream chunks from other sub-bitstreams, wherein a relationship is based on a change in bitrate to a change in quality due to the exchanging;
exchanging a sub-bitstream chunk in the combination of sub-bitstream chunks with another sub-bitstream chunk from another sub-bitstream in the plurality of sub-bitstreams based on analyzing the relationships;
continuing to exchange a sub-bitstream chunk in the combination of sub-bitstream chunks with another sub-bitstream chunk by analyzing remaining relationships until the quality measurement of the combination of sub-bitstream chunks meets a target quality; and
outputting the combination of sub-bitstream chunks.

* * * * *